Patented July 14, 1931

1,814,023

UNITED STATES PATENT OFFICE

CONWAY BARON von GIRSEWALD, OF FRANKFORT-ON-THE-MAIN, AND HANS NEUMARK, OF WETZLAR, GERMANY, ASSIGNORS TO AMERICAN LURGI CORPORATION, OF NEW YORK, N. Y., A CORPORATION OF NEW YORK

PROCESS FOR THE RECOVERY OF CADMIUM FROM COMPOUNDS OF CADMIUM AND OXYGEN BY DISTILLATION

No Drawing. Application filed September 11, 1930, Serial No. 481,340, and in France October 24, 1929.

This invention relates to a process for the recovery of cadmium from compounds of cadmium and oxygen, or substances containing same, such as oxidic cadmium ores, by distillation.

According to the invention, the cadmium-oxygen compounds are heated, in vacuo, to moderate temperatures (such as between 500 and 600° C.) at which no fusion of the charge takes place, along with reducing metals which do not induce any disengagement of gas, the liberated cadmium being distilled under these conditions and being collected in a receiver. Suitable reducing agents comprise metals, such as iron, manganese or copper, of which iron, which is applicable in pulverulent or spongy form, is particularly suitable on account of its low cost.

Since the quantitative reduction and volatilization of the cadmium, from cadmium oxide for example, takes place under these working conditions at temperatures below which compounds of zinc and oxygen begin to react with the reducing agents, it is also possible, according to the present process, to distil off pure cadmium from substances which contain admixtures of, for example, compounds of zinc, iron, lead, nickel and tin, in addition to oxidic cadmium, all the admixtures then remaining in the residue.

Moreover, mixed products, such as ores which contain oxidic cadmium compounds and, for example, oxidic zinc compounds, can also be treated by first distilling off the cadmium, for example at temperatures of about 500-600° C., or over, and condensing it, and then distilling off (and condensing) the zinc at the higher temperatures suitable for that metal. In this case also, cheap iron, which is available in the form, for example, of powder or sponge, is suitable for employment as reducing agent, with advantage. The amount of iron is preferably such that magnetic $Fe_3O_4$ is formed, which can then be separated from the other substances present, by the aid of electromagnets, and can be reconverted into spongy iron, for example, by reduction and returned, in that condition, to the process.

The iron can also be removed from the distillation residue by adding the iron employed for reduction, to the charge, in such a form, for example, more or less coarse granules, filings and the like, that, after the completion of the reduction process, it can be separated from the other components of the charge by simple sifting. Since the individual portions of the iron employed retain their form during the reaction, despite conversion into oxide, the resulting pieces of iron oxide remain on the screen when the residue is sifted after the reaction, provided their diameter is greater than the meshes or holes in the screen, whilst the other finely pulverulent components of the residue pass through said meshes or holes. The iron oxide freed from the foreign components in this manner, can be put to any use, just as well as the oxide separated by the magnetic method.

According to one method of carrying out the invention, in treating originating materials which, in addition to cadmium compounds, also contain admixtures such as compounds of zinc, iron, lead and the like, the originating materials can first be decomposed, by the metallic reducing agents, at comparatively high temperatures, which, if necessary, are considerably in excess of 800° C. after which the distillation product which is contaminated with the other volatilized components (such as zinc, lead, or the like) of the originating material, is redistilled under such conditions of pressure and temperature that the volatilization of the contaminating substances does not occur, or only in inappreciable amount. By comparison with the treatment of the originating materials in a single stage and at lower temperatures, this method of procedure offers the advantages of a considerable saving of time, in that, with the high reduction temperatures of the first stage of the process, the reduction and distillation of the cadmium must proceed more quickly. It also affords the advantage that there is no longer any need to bestow such care on the maintenance of strictly defined temperatures. The distillation of the cadmium from the (for example) zinciferous product obtained in the first stage of the process, is considerably facilitated by the relatively small bulk and good heat conductivity of this first and predominantly metallic distillate.

This method of carrying out the process is, however, of very particular importance in the treatment of originating materials containing as impurity compounds (especially oxidic compounds) of lead, and in some cases other impurities as well. Under these conditions, owing to the relatively high volatility, and high resistance to reduction, of the lead oxide, it is often—according to the nature of the lead compounds present—impossible to prevent lead from passing over, in the oxidic form, even at working temperatures of only 600° C., and less. Since, in this case, it is necessary in any way to subject the distillation product from the primary reaction to a second distillation, for the purpose of purification, the whole process is very substantially accelerated, with a corresponding saving of fuel and labour by accelerating the primary distillation at a correspondingly elevated temperature. The application as reducing agents according to the present process, of metals which do not liberate gases during the reduction process, instead of employing charcoal, offers the great advantage that not only can the cadmium be obtained in a high state of purity—especially also practically free from lead—but also with a yield which approximates very closely to the theoretical, and that the continuous maintenance of a high vacuum is greatly facilitated, thus assuring the smooth performance of the process when working for prolonged periods. Moreover, as the result of the low reduction temperatures, the furnace walls are protected, and the troubles attending the condensation of very hot metallic vapours are avoided. Finally, the fact that the furnace charge is not heated to fusion enables the cadmium vapours to come off rapidly and freely, and the performance of the entire process is correspondingly rapid and complete.

According to another method of carrying out the invention, the amount of iron employed as reducing agent is so calculated that magnetic $Fe_3O_4$ is formed in the distillation residue. This method of procedure affords the advantage that the ferroso-ferric oxide can be easily separated, by magnetic means, from all the impurities, such as lime, silica, etc. and, when refined in this manner, can be reconverted into spongy iron, by reduction, and returned, in that condition, to the process.

*Example 1*

100 kgs. of cadmium oxide, containing 87% of Cd, are mixed with 40 kgs. of spongy iron and maintained for about 8 hours at a temperature of about 500–550° C., under a vacuum of 20 mms. 0.5% of the cadmium present in the originating material will then be found in the residue 99.5% having passed over into the receiver.

*Example 2*

100 kgs. of an oxidic material containing 73% of Cd, 2.5% of Zn, 0.17% of Pb, 0.04% of Ni and 0.15% of Fe, are mixed with 35 kgs. of spongy iron and maintained for 8 hours at a temperature of 500° C., under a vacuum of 20 mms. 1.2% of the cadmium taken will then be found in the residue, whilst 98.8% has passed over into the receiver. The cadmium distillate contains less than 0.05% of impurities.

*Example 3*

15 kgs. of cadmium sludge, containing 35% of Cd and 3% of Pb, are mixed with 2 kgs. of spongy iron and heated for 6 hours at 800° C., under an absolute pressure of 20 mms. 5 kgs. of cadmium, containing 0.1% of Pb are obtained in the receiver, and are subjected to a second distillation at 500° C., a cadmium containing 0.01% of Pb being then obtained.

We claim:—

1. A process for the recovery of cadmium, which comprises heating substances containing cadmium-oxygen compounds with reducing metals in vacuo, at temperatures not substantially exceeding the distillation temperature of cadmium and collecting the cadmium distilling over.

2. A process for the recovery of cadmium, which comprises heating substances containing cadmium-oxygen compounds with iron in vacuo, at temperatures not substantially exceeding the distillation temperature of cadmium and collecting the cadmium distilling over.

3. A process for the recovery of cadmium, which comprises heating substances containing cadmium-oxygen compounds with reducing metals in vacuo, at temperatures between 500° and 600° C. and collecting the cadmium distilling over.

4. A process for the recovery of cadmium, which comprises heating substances containing oxygen compounds of cadmium and of other heavy metals, with reducing metals, in vacuo, at temperatures at which cadmium but no appreciable amounts of said other heavy metals distil off, and collecting the cadmium distilling over.

5. A process for the recovery of cadmium, which comprises heating substances containing oxygen compounds of cadmium and of zinc metals, with reducing metals in vacuo, at temperatures at which cadmium but no appreciable amounts of zinc distil off, and collecting the cadmium distilling over.

6. A process for the recovery of cadmium, which comprises heating substances containing oxygen compounds of cadmium and of zinc, with reducing metals in vacuo, at temperatures at which cadmium but no appreciable amounts of zinc distil off, and thereupon heating the residue to temperatures at which the zinc distils off.

7. A process for the recovery of cadmium, which comprises heating substances containing oxygen compounds of cadmium and of other heavy metals, with reducing metals in vacuo, at temperatures of about 500° to 600° C. to distil off the cadmium and thereupon increasing the temperature to about 850° to 1000° C. to distil off the zinc.

8. A process for the recovery of cadmium, which comprises heating originating materials which, in addition to cadmium-oxygen compounds, contain oxygen compounds of other heavy metals, with reducing metals, in vacuo and at temperatures exceeding 600° C., until the cadmium has been distilled off, and thereupon subjecting the distillation product, which is still contaminated by accompanying foreign substances, to a second distillation under conditions of pressure and temperature precluding the passing over of appreciable amounts of the disturbing impurities into the distillate.

9. A process for the recovery of cadmium, which comprises heating originating materials which, in addition to cadmium-oxygen compounds, contain oxygen compounds of lead, with reducing metals, in vacuo and at temperatures exceeding 600° C., until the cadmium has distilled over and thereupon subjecting the distillation product which is still contaminated with accompanying plumbiferous components, to a second distillation under conditions of pressure and temperature precluding the passing over of appreciable amounts of the lead into the distillate.

10. A process for the recovery of cadmium which comprises heating substances which contain cadmium-oxygen compounds in vacuo and at temperatures exceeding the distillation temperature of cadmium, with such amounts of iron that the iron is converted, in the distillation residue, into magnetic ferroso-ferric oxide, and separating said ferroso-ferric oxide from the other components of the residue by magnetic means.

11. A process for the recovery of cadmium, which comprises heating substances which contain cadimum-oxygen compounds with iron, in a not too finely divided condition, in vacuo and at temperatures exceeding the distillation temperature of cadmium, collecting the cadmium which distils over and separating the portions of iron oxide which have retained, in the residue, the original form of the iron employed, from the other finer components of the residue, by sifting.

In testimony whereof, we affix our signatures.

CONWAY BARON von GIRSEWALD.
HANS NEUMARK.